US011774580B2

(12) United States Patent
Valdes Garcia et al.

(10) Patent No.: US 11,774,580 B2
(45) Date of Patent: Oct. 3, 2023

(54) CONCEALED OBJECT DETECTION

(71) Applicant: International Business Machines Corporation, Armonk, NY (US)

(72) Inventors: Alberto Valdes Garcia, Chappaqua, NY (US); Jean-Olivier Plouchart, New York, NY (US); Petar K. Pepeljugoski, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/454,992

(22) Filed: Nov. 15, 2021

(65) Prior Publication Data

US 2022/0075055 A1 Mar. 10, 2022

Related U.S. Application Data

(63) Continuation of application No. 16/934,883, filed on Jul. 21, 2020, now Pat. No. 11,231,498.

(51) Int. Cl.
*G01S 13/88* (2006.01)
*G06T 7/70* (2017.01)
(Continued)

(52) U.S. Cl.
CPC .............. *G01S 13/887* (2013.01); *G06T 5/50* (2013.01); *G06T 7/13* (2017.01); *G06T 7/50* (2017.01);
(Continued)

(58) Field of Classification Search
CPC . G01S 13/887; G06T 7/50; G06T 7/13; G06T 7/70; G06T 5/50; G06T 2207/10044; G06T 2207/10048; H04B 7/0617
(Continued)

(56) References Cited

U.S. PATENT DOCUMENTS 6,501,414 B2   12/2002   Arndt et al.
6,754,368 B1    6/2004   Cohen
(Continued)

FOREIGN PATENT DOCUMENTS

CN       1339137 A    3/2002
CN     102629315 A    8/2012
(Continued)

OTHER PUBLICATIONS

List of IBM Patent or Patent Applications Treated as Related Filed on Jul. 21, 2020.
(Continued)

*Primary Examiner* — Michael R Neff
(74) *Attorney, Agent, or Firm* — Kunzler Bean & Adamson

(57) ABSTRACT

A method for detecting the presence of on-body concealed objects includes receiving a visible-domain camera image for a scene, determining, using the visible-domain camera image, a region of interest where a subject is present, receiving an infrared-domain camera image and a millimeter-wave (mmwave) radar image that each cover the region of interest, determining emissivity information for the region of interest using the infrared-domain camera image, determining reflectivity information for the region of interest using the mmwave radar image and determining a concealed object classification for the subject based on the emissivity information and the reflectivity information. A corresponding system and computer program product for executing the above method are also disclosed herein.

20 Claims, 8 Drawing Sheets

(51) Int. Cl.
*G06T 7/13* (2017.01)
*G06T 7/50* (2017.01)
*G06T 5/50* (2006.01)
*H04B 7/06* (2006.01)

(52) U.S. Cl.
CPC .............. *G06T 7/70* (2017.01); *H04B 7/0617* (2013.01); *G06T 2207/10044* (2013.01); *G06T 2207/10048* (2013.01)

(58) Field of Classification Search
USPC ........................................................ 382/103
See application file for complete search history.

(56) References Cited

U.S. PATENT DOCUMENTS

| | | | |
|---|---|---|---|
| 6,876,322 | B2 | 4/2005 | Keller |
| 7,365,672 | B2 | 4/2008 | Keller et al. |
| 7,417,440 | B2 | 8/2008 | Peschmann et al. |
| 7,664,324 | B2 | 2/2010 | Khodor et al. |
| 8,097,855 | B2 | 1/2012 | Gorian et al. |
| 8,412,668 | B2 | 4/2013 | Mohalik |
| 8,421,668 | B2 | 4/2013 | Ammar |
| 11,231,498 | B1* | 1/2022 | Valdes Garcia ...... G01S 13/867 |
| 2007/0075246 | A1 | 4/2007 | Gatt |
| 2008/0195347 | A1 | 8/2008 | Gatt |
| 2009/0073023 | A1 | 3/2009 | Ammar |
| 2009/0195435 | A1 | 8/2009 | Kapilevich et al. |
| 2009/0271146 | A1 | 10/2009 | Ammar |
| 2009/0289830 | A1 | 11/2009 | Pergande et al. |
| 2009/0297039 | A1 | 12/2009 | Reinpoldt, III et al. |
| 2011/0084868 | A1 | 4/2011 | Daly et al. |
| 2011/0205367 | A1 | 8/2011 | Brown et al. |
| 2013/0106848 | A1 | 5/2013 | Nguyen et al. |
| 2018/0067204 | A1 | 3/2018 | Frizzell |
| 2019/0108396 | A1 | 4/2019 | Dal Mutto et al. |
| 2019/0130216 | A1 | 5/2019 | Tomioka et al. |
| 2021/0201461 | A1* | 7/2021 | Parikh ................ G06Q 30/0629 |

FOREIGN PATENT DOCUMENTS

| | | |
|---|---|---|
| CN | 105372665 A | 3/2016 |
| CN | 105513035 A | 4/2016 |
| CN | 109444985 A | 3/2019 |
| CN | 111369541 A | 7/2020 |
| KR | 100829215 B1 | 5/2008 |
| KR | 20090079658 A | 7/2009 |
| KR | 20130023930 A | 3/2013 |
| KR | 101248150 B1 | 4/2013 |
| WO | 2007011391 A2 | 1/2007 |
| WO | 2008/048979 A2 | 4/2008 |

OTHER PUBLICATIONS

PCT/CN2021/097736, "Notification of Transmittal of the International Search Report and the Written Opinion of the International Searching Authority, or the Declaration", Sep. 1, 2021, pp. 1-9.

* cited by examiner

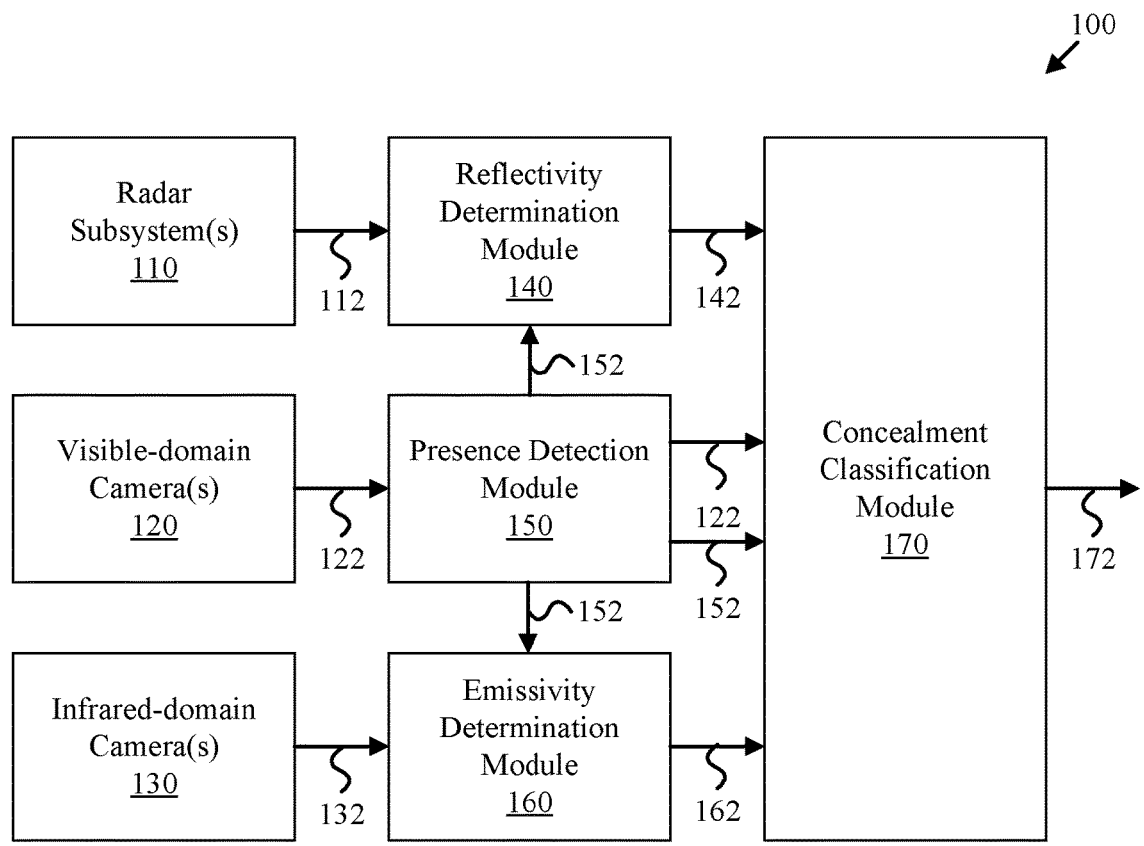

Fig. 1A

| IR emissivity | mmWave reflectivity | Classification |
|---|---|---|
| < T1 | < T2 | Thick covering. Subject's clothing may be too thick to perform inspection (i.e. heavy jacket). |
| >T1 | >T2 | Active device. Potential concealed object with IR emissivity (e.g active tablet). |
| >T1 | <T2 | No detected object. Subject is not carrying concealed object. |
| <T1 | >T2 | Reflecting object. Potential metallic or electronic concealed object (e.g. smartphone, knife, wrench, gun). |

Fig. 1B

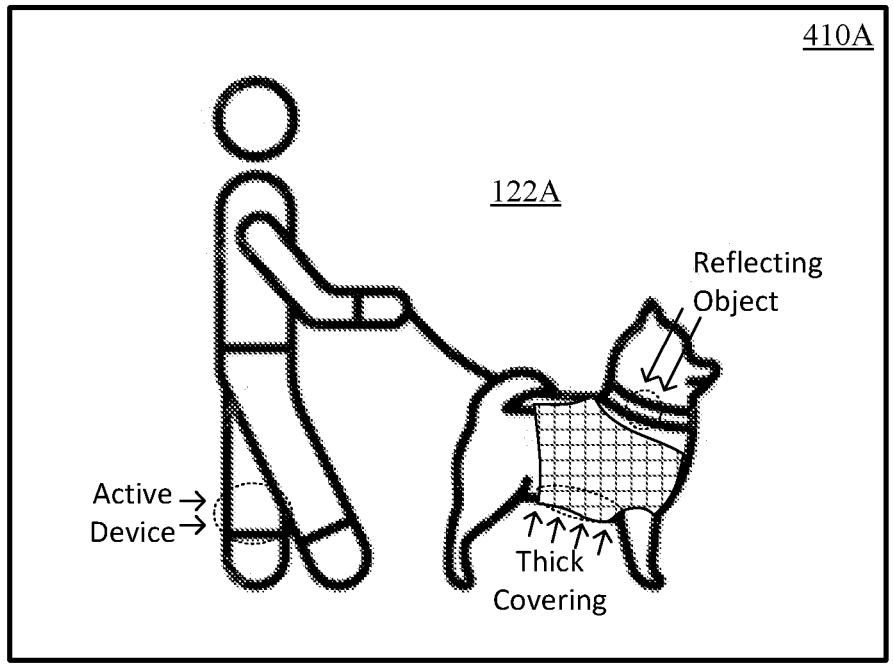
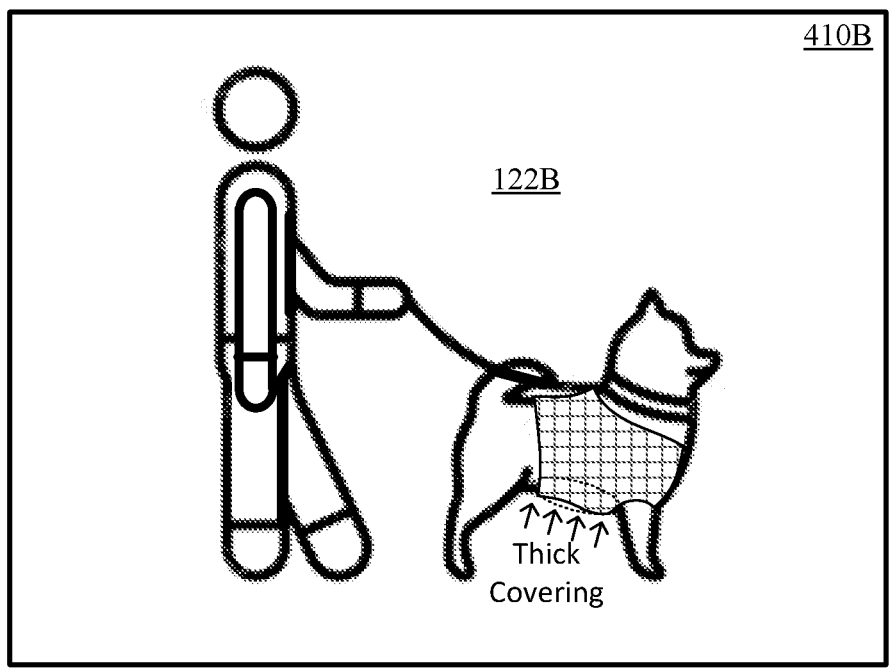
Fig. 4A

CONCEALED OBJECT DETECTION

BACKGROUND

The subject matter disclosed herein relates generally to the field of security systems and specifically to systems for detecting on-body concealed objects.

Security systems for detecting on-body concealed objects are typically labor intensive, disruptive and extremely inconvenient for persons entering a facility. For example, for each portal of entry into a secured facility, several security personnel are typically required to direct, monitor, instruct, and control entry into the facility. Individuals are often instructed to step into a large booth and stay stationary while a large scanner is rotated around their body and security personnel view an image of the person. Such scanners are typically difficult to transport and deploy. Furthermore, they often provide details with anatomical-level resolution to the security personnel but may not sense radiation blocking materials on the body of the scanned individuals.

SUMMARY OF THE INVENTION

A method for detecting the presence of on-body concealed objects includes receiving a visible-domain camera image for a scene. The method also includes determining, using the visible-domain camera image, a region of interest where a subject is present. The method also includes receiving an infrared-domain camera image and a millimeter-wave (mm-wave) radar image that each cover the region of interest. The method also includes determining emissivity information for the region of interest using the infrared-domain camera image. The method also includes determining reflectivity information for the region of interest using the mmwave radar image. Furthermore, the method includes determining a concealed object classification for the subject based on the emissivity information and the reflectivity information.

The method may include focusing a camera or radar on the region of interest. In some embodiments, the concealed object classifications include each of: an 'active device' classification, a 'reflecting object' classification, a 'no detected object' classification, and a 'thick covering' classification. The method may include aligning two or more of the visible-domain camera image, the infrared-domain camera image, and the mmwave radar image. In some embodiments, the image alignment process uses depth information (e.g., to align features at the same depth). The depth information may be extracted from complex data generated by the mmwave radar or determined from one or more background or calibration objects within the images.

A corresponding system and computer program product that each execute the above methods are also disclosed herein. By using a multi-spectral approach along with automatic determination of a concealed object classification, the disclosed method, system and computer program product reduce the required labor, disruption and inconvenience associated with subjects entering a secured facility. Furthermore, by using an automated approach that identifies areas of potential concern, those areas can be presented to security personnel without displaying anatomical details of the subjects.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered limiting of scope, the embodiments will be described and explained with additional specificity and detail through the use of the accompanying drawings, in which:

FIG. 1A is a block diagram of one example of a concealment classification system in accordance with at least one embodiment disclosed herein;

FIG. 1B is a table of one example of concealment classifications in accordance with at least one embodiment disclosed herein;

FIGS. 4A and 4B are illustrations of two examples of overlaying concealment classification information on a visual-domain image in accordance with at least one embodiment disclosed herein;

DETAILED DESCRIPTION OF THE INVENTION

Figure 2:
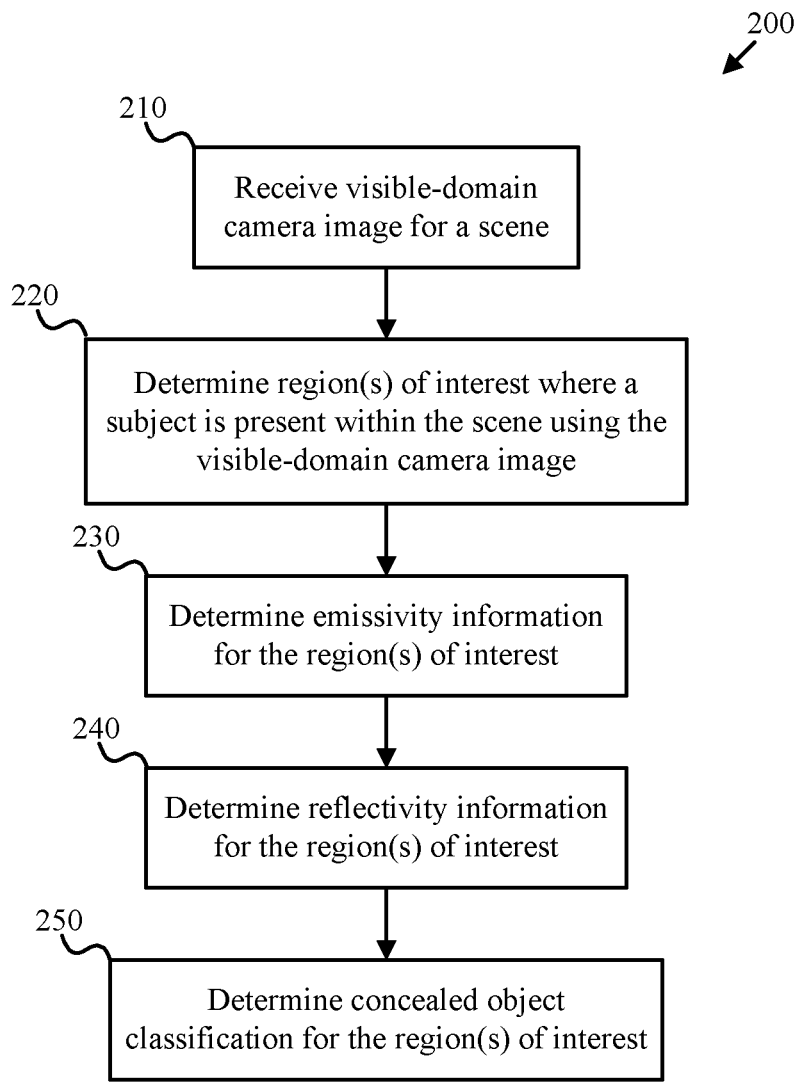
FIG. 2 is a flowchart of one example of a concealment classification method in accordance with at least one embodiment disclosed herein.

One of ordinary skill in the art will appreciate that references throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

The embodiments disclosed herein recognize that millimeter-wave radar data, infrared-domain data, and visible-domain data collectively enable the detection of on-body concealed objects and whether such detection is blocked by intervening materials. Furthermore, the embodiments disclosed herein recognize that information with sufficient resolution can be determined without revealing anatomical details of the subjects.

FIG. 1A is a block diagram of one example of a concealment classification system 100 in accordance with at least one embodiment disclosed herein. As depicted, the concealment classification system 100 includes one or more radar subsystems 110, one or more visible-domain cameras 120, one or more infrared-domain cameras 130, a reflectivity determination module 140, a presence detection module 150, an emissivity determination module 160 and a concealment classification module 170. The depicted elements function cooperatively to assess the potential for on-body concealment of objects for subjects monitored by the concealment classification system 100.

The radar subsystems 110 provide radar image data 112 to the reflectivity determination module 140. Similarly, the visible-domain cameras 120 provide visible-domain image data 122 to the presence detection module 150 and the infrared-domain cameras 130 provide infrared-domain image data 132 to the emissivity determination module 160. The provided image data 112, 122 and 132 may correspond to a scene where one or more subjects are present.

The presence detection module 150 uses the visible-domain image data 130 to determine whether subjects, such as persons or animals, are likely present within the scene. The presence detection module may define specific regions of interest 152 within the scene that each encompass a subject. For example, each region of interest 152 could be a bounding box or a shape outline for a potential subject, or a region in a 2D or 3D space.

In some embodiments, the regions of interest 152 may be used by the reflectivity determination module 140 and the emissivity determination module 160 to limit processing to those areas. The radar subsystems 110 and the infrared-domain cameras 130 may also use the regions of interest 152 to focus data collection on those areas.

The reflectivity determination module 140 uses the mmwave image data 112 to determine reflectivity information 142 for the region(s) of interest. The reflectivity information 142 may be determined at the resolution of the mmwave image data 112. Similarly, the emissivity determination module 160 uses infrared-domain image data 132 to determine emissivity information 162 for the region(s) of interest.

Since the image data 112, 122 and 132 may be captured from different perspectives, the modules 140-170 may function cooperatively to align the mmwave image data 112 and the infrared-domain image data 132 with the visible-domain image data 122. By aligning the images for the various domains, the reflectivity information 142 and the emissivity information 162 will also be aligned with the visible-domain image data 122.

In some embodiments, the mmwave image data 112 comprises phase information, amplitude information, and/or polarization information and/or depth information. The phase information, polarization information and depth information may be used to enhance alignment and concealed object detection.

Alignment of the image data from the various domains may be accomplished in a variety of methods (including those familiar to those of skill in the art) such as edge filtering, edge matching and resolving depth information. Preferably, the relative position of image capture devices (to each other) is known in advance and leveraged to facilitate image alignment. In some embodiments, image alignment occurs by detecting one or more background objects on the various (differing spectrum) images and warping and/or repositioning the images (e.g., according to techniques understood by those of skill in the art) in order to align all of the images. Such alignment may be conducted on the regions of interests or the scene as a whole. In some deployments, fixed alignment and/or calibration objects (e.g., disposed in the background) may be provided or detected.

The concealment classification module 170 uses the reflectivity information 142, the emissivity information 162 and the region(s) of interest 152 to determine concealment classifications for the region(s) of interest 152. One of skill in the art will appreciate that the reflectivity information 142 and the emissivity information 162 need not conform to a scientific standard or scale to be useful in determining concealment classifications.

FIG. 1B is a table of one example of concealment classifications in accordance with at least one embodiment disclosed herein. The depicted example is a simplified example that uses an emissivity threshold T1 and a reflectivity threshold T2 to determine concealment classifications. The depicted possible classifications include a 'thick covering' classification, an 'active device' classification, a 'no detected object' classification and a 'reflecting object' classification. In some embodiments, the classifications are presented to a user such as a security guard. For example, classification information may be overlaid on a scene, or a selected portion thereof, that is presented on a visual display (see, for example, FIGS. 4A and 4B). The classification information may be provided at various levels of granularity such as pixels, clusters of pixels, blocks of pixels, or an entire region of interest.

FIG. 2 is a flowchart of one example of a concealment classification method 200 in accordance with at least one embodiment disclosed herein. As depicted, the concealment classification method 200 includes receiving (210) a visible-domain camera image, determining (220) one or more regions of interest, determining (230) emissivity information, determining (240) reflectivity information and determining (250) a concealed object classification. The concealment classification method 200 may be conducted by one or more processors associated with the concealment classification system 100.

Receiving (210) a visible-domain camera image may include receiving a visible-domain image that captures a scene. The scene may include one or more subjects such as people or animals. Determining (220) one or more regions of interest may include determining portions of the scene where a potential subject is present. Each of the regions of interest may be defined by a border, a bounding box, or some other geometric shape that encompasses a potential subject.

Determining (230) emissivity information may include receiving infrared or similar data from one or more infrared-domain cameras and processing that data to determine the emissivity information. For example, the emissivity data at a pixel level may be compared with a reference value corresponding to an average skin temperature for a human. The amount of emissivity may be determined from the difference between the infrared data and the reference value. In some embodiments, the emissivity information is determined only for the region(s) of interest. In other embodiments, data for a larger region or the entire scene is determined and data for the specific region(s) of interest is extracted therefrom.

Determining (240) reflectivity information may include receiving mmwave data corresponding to the region(s) of interest from one or more mmwave radars and processing that data to determine the reflectivity information. For example, the mmwave data may be normalized or otherwise processed to produce the reflectivity information. In some embodiments, the reflectivity information is determined only for the region(s) of interest. In other embodiments, data for a larger region or the entire scene is determined and data for the specific region(s) of interest is extracted therefrom.

In some embodiments, the mmwave radar data comprises multiple components. For example, the mmwave radar data may comprise phase information or information for multiple (e.g., antenna) polarizations. The use of multiple components may enable the determination of the distance of various objects or features within the scene or better detection of thin reflective features such as wires. In some embodiments, the mmwave radar data is collected by electronic beam forming and/or beam steering. Using electronic beam forming and/or beam steering enables the option of scanning a wide area or focusing on particular areas of interest.

Determining (250) a concealed object classification may include using a machine learning classifier, or the like, that determines a concealment classification information for at least a portion of the region of interest. In some embodiments, the granularity of the concealment classification information is selectable by a user. For example, the granularity of concealment classifications may be pixels, clusters of similar pixels, blocks of pixels, or an entire region of interest as preferred by the user. In some embodiments, the possible concealment classifications include at least an 'active device' classification, a 'reflecting object' classification, a 'no detected object' classification, and a 'thick covering' classification. The process of determining the concealed object classification may be intentionally biased to reduce false negatives (i.e., incorrect selection of the 'no detected object' classification).

In conjunction with conducting the concealment classification method 200, concealment information and related information may be presented to an operator. For example, one or more visible-domain camera images may be presented to an operator. The concealment classification information and detected object information may be overlaid on the visible-domain camera images. See FIGS. 4A and 4B for two such examples.

It should be noted that the methods disclosed herein are also applicable to 'high-resolution' mmWave radar data such data obtained by airport scanners including those that employ mechanical antenna motion and synthetic aperture processing. However, such resolution is not required for successful deployment of the disclosed multi-spectral methods and systems. For example, low-cost beam steering scanners such as those depicted in the Figures may be successfully integrated into an effective functional system. In some embodiments, portable configurations are also readily attainable.

Figure 3A:
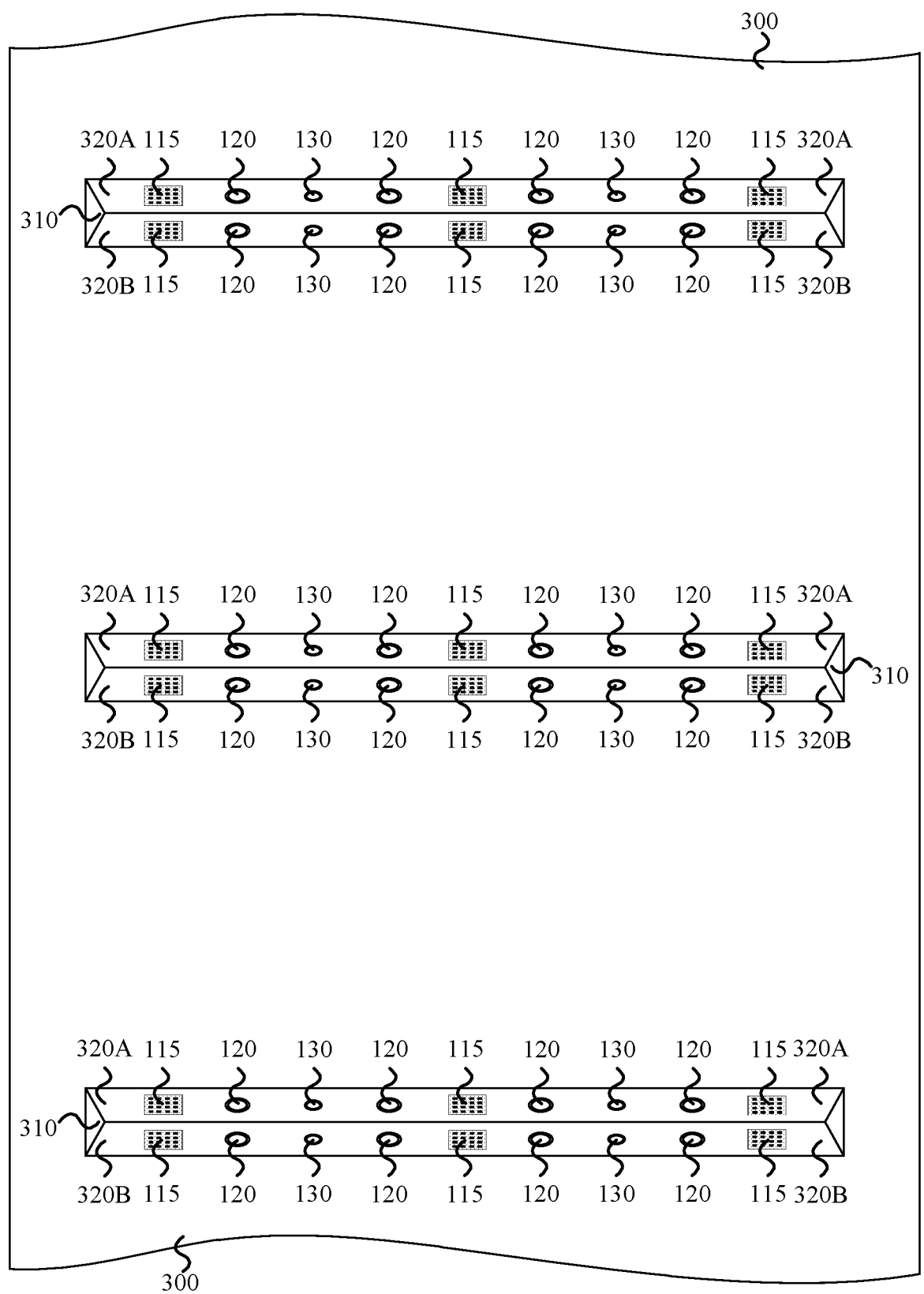
FIG. 3A is a bottom view drawing of one example of a ceiling installation of a hallway monitoring deployment in accordance with at least one embodiment disclosed herein.

FIG. 3A is a bottom view drawing of one example of a hallway monitoring deployment 300 in accordance with at least one embodiment disclosed herein. As depicted, the hallway monitoring deployment 300 includes one or more data acquisition panels 310 mounted on one or more hallway surfaces such as ceilings and/or walls. The data acquisition panels 310 each include various image capture devices mounted thereon.

In the depicted embodiment, each of the data acquisition panels have a forward facing surface 320A and a backward facing surface 320B which enable the capture of images in at least two directions (e.g., forward and backward) along a hallway or entry. The surfaces 320 may be recessed or protruding surfaces. In the depicted embodiment, each of the surfaces 320 have radar antennas 115, visible-domain cameras 120 and infrared-domain cameras 130 mounted thereon. In some embodiments, the radar antennas 115 are beam steerable arrays of patch antennas. The image capture devices enable the collection of radar image data 112, visible-domain image data 122 and infrared-domain image data 132 for subjects moving along a hallway or entry.

Figure 3B:
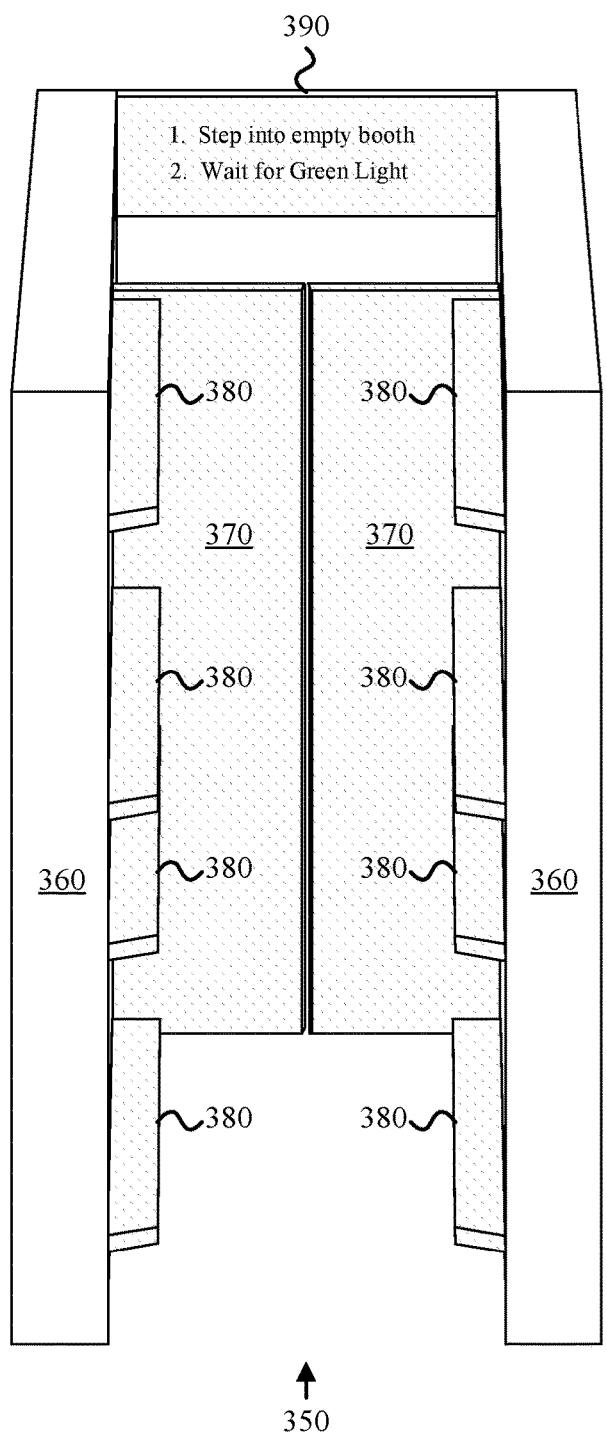
FIG. 3B is a perspective view drawing and FIG. 3C is an interior side view drawing of one example of a security portal deployment in accordance with at least one embodiment disclosed herein.
Figure 3C:
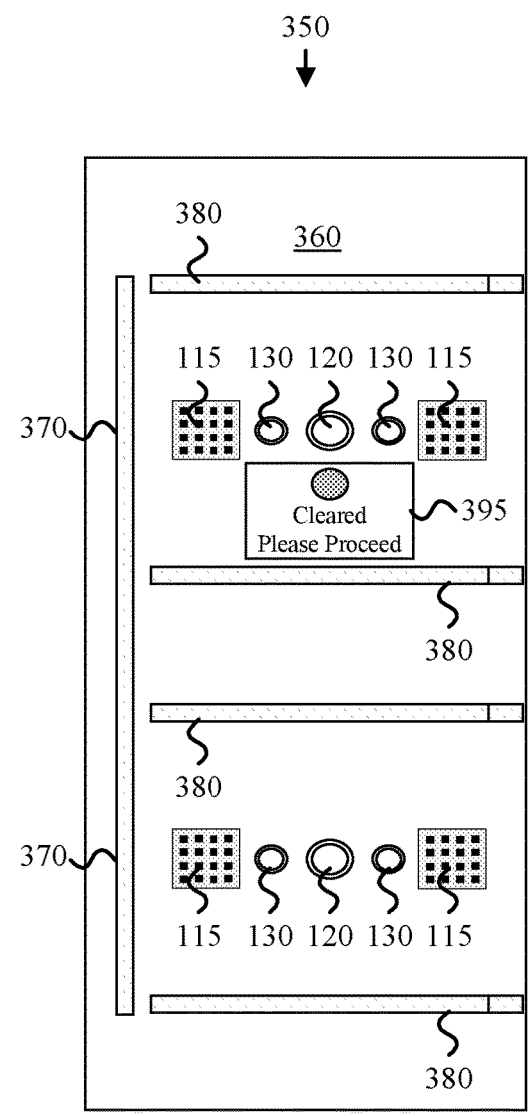

FIG. 3B is a perspective view drawing and FIG. 3C is an interior side view drawing of one example of a security portal deployment 350 in accordance with at least one embodiment disclosed herein. As depicted, the security portal deployment 350 includes a pair of walls 360 with exit doors 370 and guard rails 380. The security portal deployment 350 enables the acquisition of image data needed by the concealment classification method 200.

Each of the walls 360 may have various image capture devices mounted thereon such as radar antennas 115, visible-domain cameras 120 and infrared-domain cameras 130. The image capture devices enable the collection of radar image data 112, visible-domain image data 122 and infrared-domain image data 132 for a subject positioned between the walls 360. In the depicted embodiment, image data from multiple image capture devices of the same type and disposed on the same wall 360 (or the same surface 320 in deployment 300) may be stitched together to form a complete image of one side of the subject(s). Image stitching may be conducted using techniques known to those of skill in the art.

In some embodiments, the radar antennas 115 (e.g., in deployment 300 or 350) are for an array of patch antennas that enables beam forming and beam steering. In certain embodiments or modes, some of the radar antennas 115 are dedicated transmit antennas and others are dedicated receive antennas. For example, each of the transmit and antennas may employ beam steering to illuminate specific areas and thereby improve the resolution of reflectivity information. In other embodiments or modes, each of the radar antennas may operate as a transmit antenna or a receive antenna. For example, each of the antennas 115 may be activated as a broad beam transmitter in round-robin fashion and all of the other (non-transmitting) antennas may operate as receive antennas. As understood by those of skill in the art, the relative delay of reflections from various reflective areas at the various receive antennas (at known positions) may be used to pinpoint the (3D) location of those reflective areas.

In addition to the image capture devices, the security portal deployment 350 may, in some embodiments, include an instruction panel 390 and a subject interaction monitor 395. The instruction panel 390 and the subject interaction monitor 395 may guide the subject on how to use the portal 350. The subject interaction monitor 395 may also prompt the subject for information and enable the subject to communicate with real or virtual security personnel. After proper processing, the subject may be allowed to exit the portal through the exit doors 370. In an embodiment, a portal may avoid the use of doors 370, enabling subjects to walk as there are being scanned. In this case, the subject would stop only if instructed to do so by the instruction panel after an anomaly is detected.

It should be emphasized that the security personnel may include virtual security personnel (e.g., avatars or pre-recorded video prompts) that interact with subjects. The interactions between multiple subjects and their corresponding virtual security personnel may be monitored by single security guard. The security guard may intervene only when necessary for effective subject interaction.

It should also be noted that in addition to the depicted hallway (i.e., installed) deployment or the depicted portal deployment (which in some embodiments may be moved as needed), small portable deployments are attainable with the present invention. For example, a briefcase-sized deployment is attainable with the present invention which enables portable usage at outdoor events or the like.

Figure 4B:
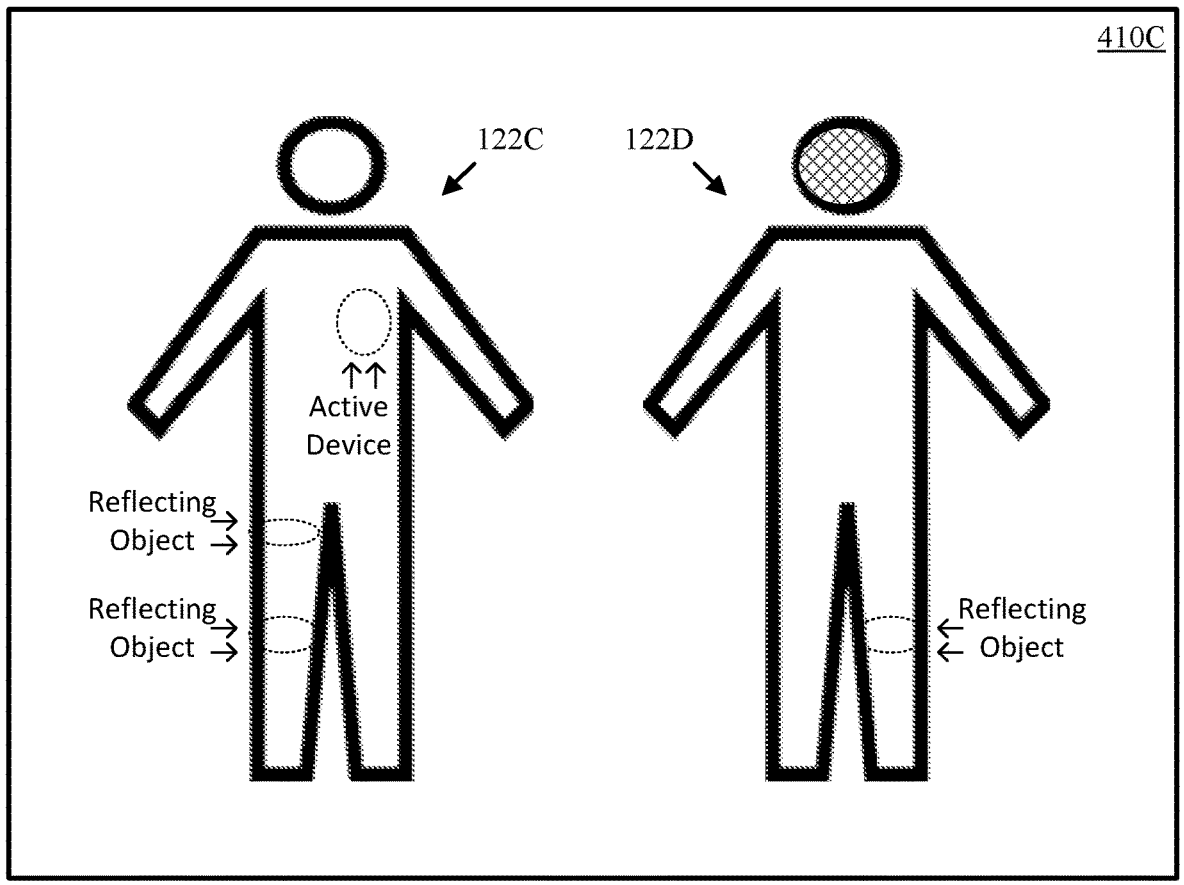

FIGS. 4A and 4B are illustrations of two examples of overlaying concealment classification information on a visual-domain image 122 in accordance with at least one embodiment disclosed herein. FIG. 4A depicts an example where the image data is collected by image capture devices disposed (e.g., recessed) on the walls of a hallway. The image data may be processed by the concealment classification method 200. The processing results may be displayed on a set of monitors 410 used by security personnel.

In the example depicted in FIG. 4A, a monitor 410A displays a first side of a pair of subjects advancing down a hallway and a monitor 410B displays a second side of the same subjects. The concealment classification method 200 may identify several regions of concern and label those regions with a concealed object classification. In the depicted example, an 'active device' region, a 'thick covering' region and a 'reflecting object' region are overlaid on a pair of visible-domain images 122 (122A and 122B) as captured by opposing visible-domain cameras 120. The images 122 may be oriented (e.g., mirrored from each other) in order to have the same direction of progression for the pair of subjects. In the example depicted in FIG. 4A, the 'thick covering' region could cover a thermally or electrically active device (i.e. an 'active device' region). Consequently, identifying the 'thick covering' region increases security by enabling security personnel to identify subjects that may warrant further inspection.

In the example depicted in FIG. 4B, a monitor 410C displays both a first side image 122C and a second side image 122D of a subject situated within a security portal 350. In the depicted example, an 'active device' region and a 'reflecting object' region are overlaid on the visible-domain images 122C and 122D as captured by opposing visible-domain cameras 120. The overlaid regions may display useful information without providing anatomical detail. Consequently, the privacy of subjects may be protected.

Figure 5A:
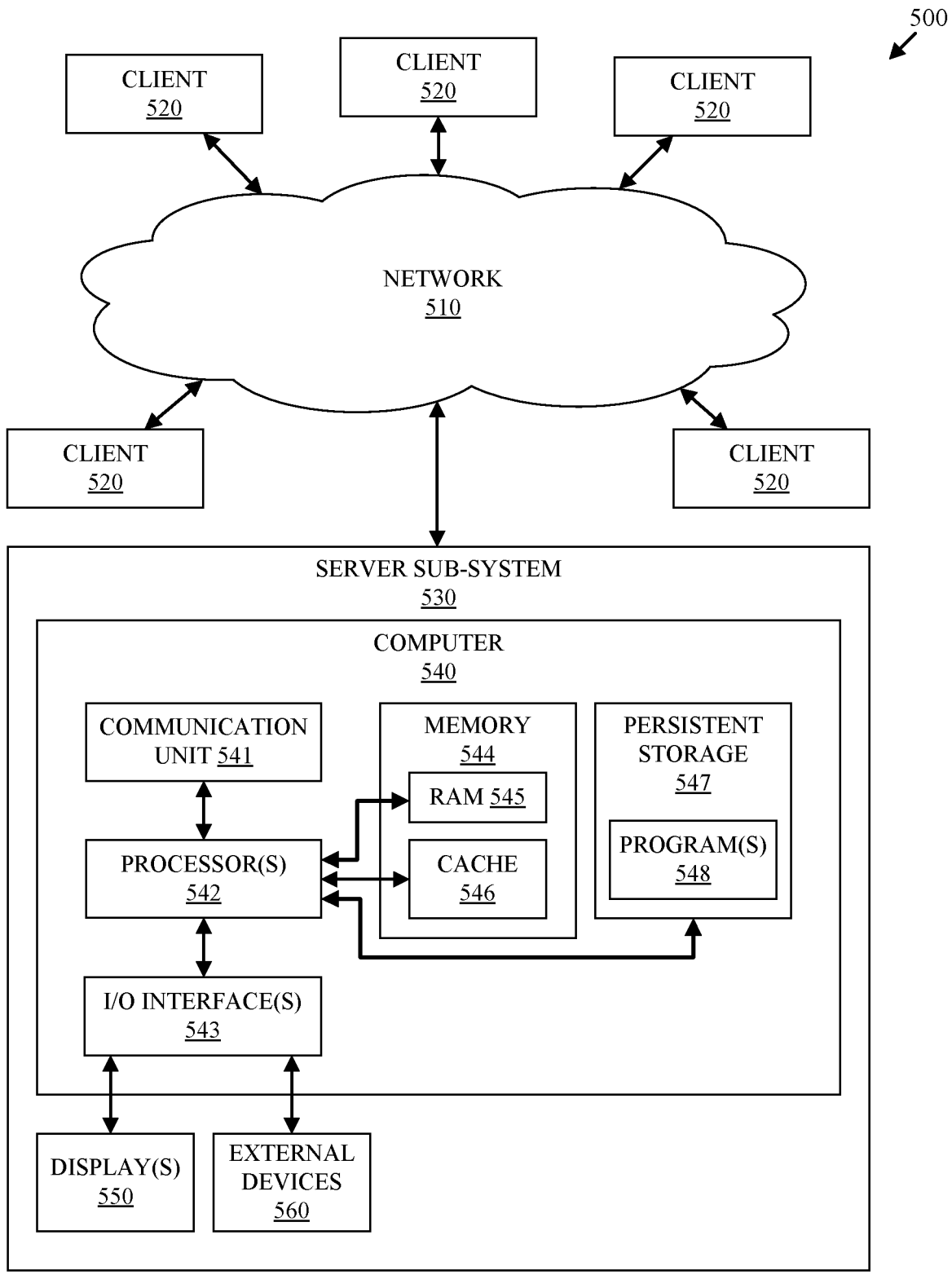
FIG. 5A is a block diagram illustrating various portions of a computing environment in accordance with at least one embodiment disclosed herein.

FIG. 5A is a block diagram illustrating various portions of a computing system 500 in accordance with at least one embodiment disclosed herein. As depicted, computing system 500 includes a communication network 510, one or more client devices 520, and at least one server subsystem 530. The depicted server subsystem 530 includes at least one computer 540 connected to one or more displays 550 and one or more external devices 550. The depicted computer 540 includes a communication unit 541, one or more processors 542, a set of I/O interfaces 543, memory 544, including random access (i.e., main) memory 545 and cache memory 546, and persistent storage 547 that stores one or more programs or executables 548.

Similar to the depicted subsystem 530, the clients 520 may comprise a computer 540. Subsystem 530 and computer 540 are, in many respects, representative of the subsystems and devices that can execute at least a portion of one or more methods disclosed herein. Accordingly, several portions of subsystem 530 and computer 540 will now be discussed in the following paragraphs.

Computer 540 may be a laptop computer, tablet computer, netbook computer, personal computer (PC), desktop computer, personal digital assistant (PDA), smart phone, or any programmable electronic device capable of communicating via network 510. Each executable 548 is a collection of machine-readable instructions and/or data that is used to perform at least some of the software functions discussed herein. For example, the methods describe herein may correspond to one or more executables 548.

Computer 540 is capable of communicating with other computing devices, such as the clients 520 and other subsystems 530, via communication network 510. Communication network 510 can be, for example, a local area network (LAN), a wide area network (WAN) such as the Internet, or a combination of the two, and can include wired, wireless, or fiber optic connections. In general, communication network 510 can be any combination of connections and protocols that will support communications between computing devices such as the server subsystem and client subsystems.

Computer 540 is shown as a block diagram with many double arrows. These double arrows (no separate reference numerals) represent a communications fabric, which provides communications between various components of computer 540. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 544 and persistent storage 547 are computer-readable storage media. In general, memory 544 can include any suitable volatile or non-volatile computer-readable storage media. It is further noted that, now and/or in the near future: (i) external device(s) 560 may be able to supply some or all memory for subsystem 530; and/or (ii) devices external to subsystem 530 may be able to provide memory for subsystem 530.

The programs 548 are stored in persistent storage 547 for access and/or execution by one or more of the respective computer processors 542, usually through one or more memories of memory 544. Persistent storage 547: (i) is at least more persistent than a signal in transit; (ii) stores the programs (including its soft logic and/or data) on a tangible medium (such as magnetic or optical domains); and (iii) may be substantially less persistent than permanent storage. Alternatively, data storage may be more persistent and/or permanent than the type of storage provided by persistent storage 547.

Programs 548 may include both machine readable and performable instructions, and/or substantive data (e.g., the type of data stored in a database). In one particular embodiment, persistent storage 547 includes a magnetic hard disk drive. To name some possible variations, persistent storage 547 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 547 may also be removable. For example, a removable hard drive may be used for persistent storage 547. Other examples include optical and magnetic disks, thumb drives, and smart cards that are inserted into a drive for transfer onto another computer-readable storage medium that is also part of persistent storage 547.

Communications unit 541 in the depicted example provides for communications with other data processing systems or devices external to subsystem 520. In these examples, communications unit 541 includes one or more network interface cards. Communications unit 541 may provide communications through the use of either, or both, physical and wireless communications links. Any software modules discussed herein may be downloaded to a persistent storage device (such as persistent storage device 560) through a communications unit (such as communications unit 541).

I/O interface set 543 allows for input and output of data with other devices that may be connected locally in data communication with computer 540. For example, I/O interface set 543 provides a connection to external device set 560. External device set 560 will typically include devices such as a keyboard, keypad, touch screen, and/or some other suitable input device. External device set 560 can also include portable computer-readable storage media such as, for example, thumb drives, portable optical or magnetic disks, and memory cards. Software and data used to practice embodiments of the present invention, for example, programs 548, can be stored on such portable computer-readable storage media. In these embodiments the relevant software may (or may not) be loaded, in whole or in part, onto persistent storage device 560 via I/O interface set 543. I/O interface set 543 also connects in data communication with display device 550. Display device 550 provides a mechanism to display data to a user and may be, for example, a computer monitor or a smart phone display screen.

Figure 5B:
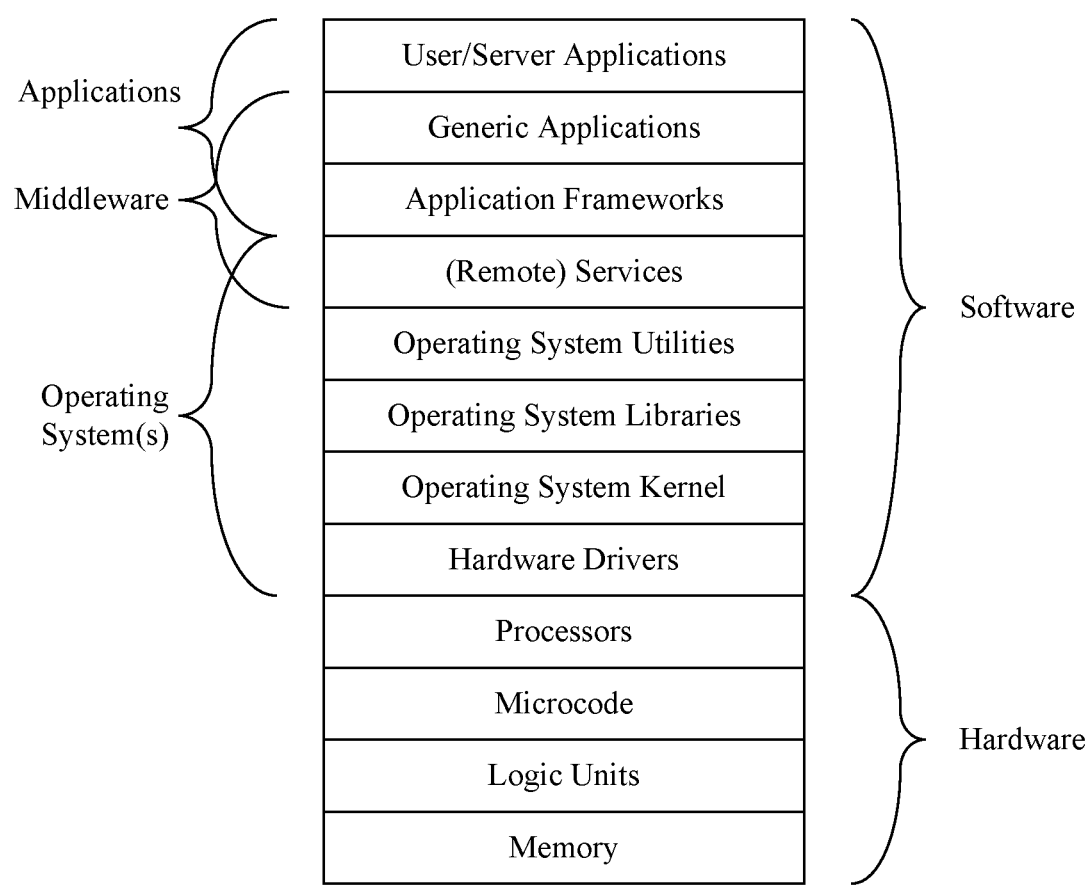
FIG. 5B is a block diagram illustrating one example of a computing stack in accordance with at least one embodiment disclosed herein.

FIG. 5B is a block diagram illustrating one example of a computing stack 570 in accordance with at least one embodiment disclosed herein. As depicted, the computing stack 570 includes a number of computing layers 572 used for conducting computing operations. In the depicted embodiment, the layers include hardware layers and software layers. The various software layers include operating system layers associated with executing one or more operating systems, middleware layers associated with executing middleware that expands and/or improves the functionality of hardware layers, and executing operating system(s). The software layers may also include various application-specific layers. The application-specific layers may include application frameworks that further expand on, and/or improve upon, the functionality of hardware layers and operating system layers.

The memory layer may include volatile memory, non-volatile memory, persistent storage and hardware associated with controlling such memory. The logic units may include CPUs, arithmetic units, graphic processing units, and hardware associated with controlling such units. The microcode layer may include executable instructions for controlling the processing flow associated with moving data between memory and the logic units. The processor layer may include instruction fetch units, instruction decode units, and the like that enable execution of processing instructions and utilization of the underlying hardware layers.

The hardware drivers (also known as the hardware abstraction layer) may include executable code that enables an operating system to access and control storage devices, DMA hardware, I/O buses, peripheral devices, and other hardware associated with a computing environment. The operating system kernel layer may receive I/O requests from higher layers and manage memory and other hardware resources via the hardware drivers. The operating system kernel layer may also provide other functions such as inter-process communication and file management.

Operating system libraries and utilities may expand the functionality provided by the operating system kernel and provide an interface for accessing those functions. Libraries are typically leveraged by higher layers of software by linking library object code into higher level software executables. In contrast, operating system utilities are typically standalone executables that can be invoked via an operating system shell that receives commands from a user and/or a script file. Examples of operating system libraries include file I/O libraries, math libraries, memory management libraries, process control libraries, data access libraries, and the like. Examples of operating system utilities include anti-virus managers, disk formatters, disk defragmenters, file compressors, data or file sorters, data archivers, memory testers, program installers, package managers, network utilities, system monitors, system profilers, and the like.

Services are often provided by a running executable or process that receives local or remote requests from other processes or devices called clients. A computer running a service is often referred to as a server. Examples of servers include database servers, file servers, mail servers, print servers, web servers, game servers, and application servers.

Application frameworks provide functionality that is commonly needed by applications and include system infrastructure frameworks, middleware integration, frameworks, enterprise application frameworks, graphical rendering frameworks, and gaming frameworks. An application framework may support application development for a specific environment or industry. In some cases, application frameworks are available for multiple operating systems and providing a common programming interface to developers across multiple platforms.

Generic applications include applications that are needed by most users. Examples of generic applications include mail applications, calendaring and scheduling applications, and web browsers. Such applications may be automatically included with an operating system.

One of skill in the art will appreciate that an improvement to any of the depicted layers, or similar layers that are not depicted herein, results in an improvement to the computer itself including the computer 540 and/or the client devices 510. One of skill in the art will also appreciate that the depicted layers are given by way of example are not representative of all computing devices. Nevertheless, the concept of improving the computer itself by improving one or more functional layers is essentially universal.

The executables and programs described herein are identified based upon the application or software layer for which they are implemented in a specific embodiment of the present invention. However, it should be appreciated that any particular program nomenclature herein is used merely for convenience, and thus the present invention should not be limited to use solely in any specific identified application or software layer.

The features, advantages, and characteristics of the embodiments described herein may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA), may execute the computer-readable program instructions by utilizing state information of the computer-readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus, or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some of the functional units described in this specification may have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

In the preceding description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The description of elements in each figure may refer to elements of proceeding figures. Like numbers refer to like elements in all figures, including alternate embodiments of like elements. The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method for detecting the presence of on-body concealed objects, the method comprising:
   receiving a visible-domain camera image for a scene;
   automatically determining, from the visible-domain camera image, a region of interest within the scene where a subject is present;
   receiving an infrared-domain camera image and a millimeter-wave (mmwave) radar image that each cover the region of interest;
   determining emissivity information for the region of interest from the infrared-domain camera image;
   determining reflectivity information for the region of interest from the mmwave radar image;
   determining a concealed object classification for the subject based on the emissivity information and the reflectivity information; and
   aligning two or more of the visible-domain camera image, the infrared-domain camera image, and the mmwave radar image,
   wherein:
      aligning comprises using depth information, and
      the depth information is determined from one or more background objects.

2. The method of claim 1, wherein the concealed object classification is one of a group of determinable concealed object classifications that comprise each of: an 'active device' classification, a 'reflecting object' classification, a 'no detected object' classification, and a 'thick covering' classification.

3. The method of claim 1, further comprising presenting the visible-domain camera image to an operator and overlaying information about potential concealed objects on the visible-domain camera image.

4. The method of claim 1, wherein aligning comprises edge filtering.

5. The method of claim 1, wherein the depth information is extracted from the mmwave radar image.

6. The method of claim 1, further comprising focusing a camera or radar on the region of interest.

7. The method of claim 1, wherein the mmwave radar image comprises reflectivity information for at least one polarization.

8. The method of claim 1, wherein the mmwave radar image is generated by a mmwave radar and the mmwave radar comprises an antenna array.

9. The method of claim 8, wherein the antenna array is a beam steerable antenna array.

10. A computer program product for detecting the presence of on-body concealed objects, the computer program product comprising a computer readable storage medium having program instructions embodied therewith, wherein the computer readable storage medium is not a transitory signal per se, the program instructions executable by a processor to cause the processor to conduct a method comprising:
    receiving a visible-domain camera image for a scene;
    automatically determining, from the visible-domain camera image, a region of interest within the scene where a subject is present;
    receiving an infrared-domain camera image and a millimeter-wave (mmwave) radar image that each cover the region of interest;
    determining emissivity information for the region of interest from the infrared-domain camera image;
    determining reflectivity information for the region of interest from the mmwave radar image;
    determining a concealed object classification for the subject based on the emissivity information and the reflectivity information; and
    aligning two or more of the visible-domain camera image, the infrared-domain camera image, and the mmwave radar image,
    wherein:
       aligning comprises using depth information, and
       the depth information is determined from one or more background objects.

11. The computer program product of claim 10, wherein aligning comprises edge filtering or using depth information.

12. The computer program product of claim 11, wherein the depth information is extracted from the mmwave radar image.

13. The computer program product of claim 10, wherein the method further comprises focusing a camera or radar on the region of interest.

14. The computer program product of claim 10, wherein the mmwave radar image comprises reflectivity information for at least one polarization.

15. A system for detecting the presence of on-body concealed objects, the system comprising:
    one or more processors; and
    a computer-readable storage medium having program instructions embodied therewith, wherein the computer-readable storage medium is not a transitory signal per se, the program instructions executable by the one or more processors to cause the one or more processors to conduct a method comprising:
       receiving a visible-domain camera image for a scene;
       automatically determining, from the visible-domain camera image, a region of interest within the scene where a subject is present;
       receiving an infrared-domain camera image and a millimeter-wave (mmwave) radar image that each cover the region of interest;
       determining emissivity information for the region of interest from the infrared-domain camera image;

determining reflectivity information for the region of interest from the mmwave radar image;

determining a concealed object classification for the subject based on the emissivity information and the reflectivity information; and aligning two or more of the visible-domain camera image, the infrared-domain camera image, and the mmwave radar image, wherein:

aligning comprises using depth information, and the depth information is determined from one or more background objects.

16. The system of claim 15, wherein aligning comprises edge filtering or using depth information.

17. The system of claim 16, wherein the depth information is extracted from the mmwave radar image.

18. The system of claim 15, further comprising focusing a camera or radar on the region of interest.

19. The system of claim 15, wherein the mmwave radar image comprises reflectivity information for at least one polarization.

20. The system of claim 15, wherein the mmwave radar image is generated by a mmwave radar and the mmwave radar comprises an antenna array.

* * * * *